(12) United States Patent
Ruan

(10) Patent No.: US 12,232,917 B1
(45) Date of Patent: Feb. 25, 2025

(54) ELECTRIC TOOTHBRUSH HANDLE

(71) Applicant: Xiaofeng Ruan, Ganzhou (CN)

(72) Inventor: Xiaofeng Ruan, Ganzhou (CN)

(*) Notice: Subject to any disclaimer, the term of this patent is extended or adjusted under 35 U.S.C. 154(b) by 0 days.

(21) Appl. No.: 18/771,977

(22) Filed: Jul. 12, 2024

(51) Int. Cl.
*A61C 17/34* (2006.01)
*A46B 13/02* (2006.01)
*A61C 17/22* (2006.01)

(52) U.S. Cl.
CPC ............ *A61C 17/225* (2013.01); *A46B 13/02* (2013.01); *A61C 17/221* (2013.01)

(58) Field of Classification Search
CPC ... A61C 17/225; A61C 17/34; A61C 17/3418; A61C 17/224
See application file for complete search history.

(56) References Cited

U.S. PATENT DOCUMENTS

| | | | | |
|---|---|---|---|---|
| 3,379,906 A * | 4/1968 | Spohr | ................. | A61H 13/00 310/83 |
| 5,311,633 A * | 5/1994 | Herzog | .............. | A61C 17/3418 74/25 |
| 8,943,634 B2 * | 2/2015 | Sokol | ................. | A61C 17/26 15/22.1 |
| 10,449,023 B2 * | 10/2019 | Wagner | ................. | A61C 17/36 |
| 10,912,377 B1 | 2/2021 | Kuang | | |
| 2022/0039545 A1 | 2/2022 | Kuang | | |
| 2022/0183809 A1 * | 6/2022 | Ingold | ..................... | A46B 13/02 |
| 2024/0108447 A1 * | 4/2024 | Scherzinger | ....... | A61C 17/3481 |

FOREIGN PATENT DOCUMENTS

| | | |
|---|---|---|
| CN | 210330801 U | 4/2020 |
| CN | 113180867 A | 7/2021 |
| CN | 219720927 U | 9/2023 |

* cited by examiner

*Primary Examiner* — Gregory Robert Weber

(57) ABSTRACT

The present invention discloses an electric toothbrush handle, which comprises: a first housing, wherein the first housing is provided with a first mounting cavity and a first mounting hole communicated with the first mounting cavity; a drive rod, wherein one end of the drive rod extends into the first mounting cavity from the first mounting hole; a transmission mechanism, wherein the transmission mechanism is arranged in the first mounting cavity, and the transmission mechanism comprises a mounting box and a transmission assembly arranged in the mounting box; and a drive motor, wherein the drive motor is arranged in the first mounting cavity, the mounting box is further provided with a third mounting hole, and the drive motor is in driving connection with the rotating member of the transmission mechanism through the third mounting hole. The present invention effectively improves the cleaning effect of the electric toothbrush.

14 Claims, 7 Drawing Sheets

ELECTRIC TOOTHBRUSH HANDLE

TECHNICAL FIELD

The present invention relates to the technical field of daily necessities, and in particular, to an electric toothbrush handle.

BACKGROUND

In the field of electric toothbrushes, the design of an electric toothbrush handle is one of the key factors affecting the cleaning effect and use experience. A conventional electric toothbrush design usually relies on the swinging of a motor shaft to drive a brush head to reciprocate for achieving the purpose of cleaning teeth. However, this design has some problems in practical applications.

Firstly, the motor shaft generally has a small swing range, which limits the motion range and cleaning ability of the brush head. Due to the limited swing range, the brush head may not be able to penetrate deep between teeth and hard-to-reach areas, resulting in poor cleaning effects.

Secondly, the swing frequency and the force of the motor shaft are difficult to achieve the ideal cleaning effect. If the swing frequency is too low or the force is insufficient, dental plaque and food residues on the surfaces of the teeth cannot be effectively removed; and if the swing frequency is too high or the force is too great, unnecessary stimulation and damage may be caused to teeth and gums.

Therefore, how to design an electric toothbrush handle capable of increasing the swing range of the motor shaft and improving the cleaning effect becomes a technical issue to be resolved urgently in the field of electric toothbrushes.

SUMMARY

A primary objective of the present invention is to provide an electric toothbrush handle, which aims to design a stable support and guide structure, so as to solve the technical problem of the poor cleaning effect of the electric toothbrush.

To achieve the above objective, the present invention provides an electric toothbrush handle. The electric toothbrush handle comprises: a first housing, wherein the first housing is provided with a first mounting cavity and a first mounting hole communicated with the first mounting cavity;
a drive rod, wherein one end of the drive rod extends into the first mounting cavity from the first mounting hole;
a transmission mechanism, wherein the transmission mechanism is arranged in the first mounting cavity, the transmission mechanism comprises a mounting box and a transmission assembly arranged in the mounting box, the mounting box is provided with a second mounting hole corresponding to the first mounting hole, the drive rod extends into the mounting box from the second mounting hole, the transmission assembly comprises a first transmission arm fixed on the drive rod, a second transmission arm with one end hinged to the first transmission arm and a rotating member hinged to the other end of the second transmission arm, the rotating member comprises a main body and an eccentric shaft eccentrically arranged on the main body, and the rotating member is hinged to the second transmission arm through the eccentric shaft; and
a drive motor, wherein the drive motor is arranged in the first mounting cavity, the mounting box is further provided with a third mounting hole, and the drive motor is in driving connection with the rotating member of the transmission mechanism through the third mounting hole.

Optionally, the mounting box comprises a second housing and a sealing cover matched with the second housing, the rotating member further comprises a first rotating shaft and a second rotating shaft that are coaxially arranged, the first rotating shaft is fixed at one end of the eccentric shaft far away from the main body, the second rotating shaft is fixed at one side of the main body opposite to the eccentric shaft, the sealing cover and the second housing are respectively provided with first limiting grooves corresponding to the first rotating shaft and the second rotating shaft, and the first rotating shaft and the second rotating shaft are located in the first limiting grooves.

Optionally, the second transmission arm is shaped as an elongated arc.

Optionally, the transmission assembly further comprises a third rotating shaft, the second transmission arm and the first transmission arm are both provided with mounting grooves, and two ends of the third rotating shaft are respectively located in the mounting grooves of the second transmission arm and the first transmission arm.

Optionally, the first transmission arm is provided with a fourth mounting hole, a limiting block is arranged in the fourth mounting hole of the first transmission arm, the drive rod is provided with a second limiting groove matched with the limiting block, the drive rod is fixed in the fourth mounting hole, and the limiting block is located in the second limiting groove.

Optionally, a first limiting boss used to limit the drive rod is convexly provided in the second housing, a third limiting groove is formed at a top of the first limiting boss, and an end portion of the drive rod is located in the third limiting groove.

Optionally, a second limiting boss used to limit the drive rod is provided on a periphery of the second mounting hole of the sealing cover, and the second mounting hole penetrates through the second limiting boss.

Optionally, the electric toothbrush handle further comprises a sealing rubber sleeve, the sealing rubber sleeve is sleeved on an outer wall of the drive rod, one end of the sealing rubber sleeve abuts against the second limiting boss, and the other end abuts against an inner wall of the first housing.

Optionally, the electric toothbrush handle further comprises a tightening spring, and the tightening spring is sleeved on one end of the sealing rubber sleeve far away from the second limiting boss.

Optionally, a third limiting boss adapted to the third mounting hole is arranged on a periphery of a drive shaft of the drive motor, and the third limiting boss is located in the third mounting hole.

Optionally, the electric toothbrush handle further comprises a mounting frame arranged in the first mounting cavity, a second mounting cavity is formed in the mounting frame, the drive motor is arranged in the second mounting cavity, and one end of the mounting frame is fixedly connected to the mounting box.

Optionally, the electric toothbrush handle further comprises a control assembly arranged in the first mounting cavity, the control assembly comprises a main control board electrically connected to the drive motor and a battery electrically connected to the main control board, a third mounting cavity is also formed in the mounting frame, the main control board is fixed to an outer wall of the mounting frame, and the battery is arranged in the third mounting cavity.

Optionally, the control assembly further comprises a wireless charging coil electrically connected to the main control board, and the wireless charging coil is arranged near a bottom of the electric toothbrush handle.

Optionally, the electric toothbrush handle further comprises an elastic abutment member, the elastic abutment member is arranged at a bottom of the mounting frame, one side of the elastic abutment member abuts against the mounting frame, and the other side abuts against the wireless charging coil.

Optionally, the elastic abutment member comprises an elastic portion and an abutment ring, the elastic portion comprises a transverse plate and two elastic side plates connected to two ends of the transverse plate respectively, the transverse plate abuts against the mounting frame, one end of each of the two elastic side plates far away from the transverse plate is fixed to each of two opposite sides of the abutment ring, and the abutment ring abuts against the wireless charging coil.

Optionally, the elastic side plate is made of a flexible material, and the elastic side plate is in a wave shape.

Optionally, the elastic abutment member further comprises at least one positioning shaft, the mounting frame is provided with a positioning groove matched with the positioning shaft, and the positioning shaft is located in the positioning groove.

Optionally, the first housing comprises a main housing and an end cover fixedly connected to the main housing, a fourth limiting boss is convexly provided in the end cover, and the wireless charging coil and the abutment ring are both sleeved outside the fourth limiting boss.

According to the technical solution of the present invention, one end of a drive rod extends into a mounting box from a first mounting hole and a second mounting hole, a first transmission arm is fixed on the drive rod, one end of the first transmission arm is hinged to a second transmission arm, the other end of the second transmission arm is hinged to a rotating member, wherein the rotating member comprises a main body and an eccentric shaft eccentrically arranged on the main body, the rotating member is hinged to the second transmission arm through the eccentric shaft, a drive motor is arranged in a first mounting cavity, the drive motor is in driving connection with the rotating member of a transmission mechanism through a third mounting hole so as to drive the rotating member to rotate, the drive rod can receive a stronger driving force through the matching use of the first transmission arm, the second transmission arm and the rotating member in the transmission mechanism, and further drive a brush head to reciprocate in a larger range, so that the brush head can penetrate deep between teeth and hard-to-reach areas for cleaning, which effectively improves the cleaning effect of the electric toothbrush.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is clear that the drawings in the description below are some embodiments of the present invention, and those of ordinary skill in the art can obtain other drawings according to the structures illustrated in these drawings without creative efforts.

DESCRIPTIONS OF REFERENCE NUMERALS

Figure 1:
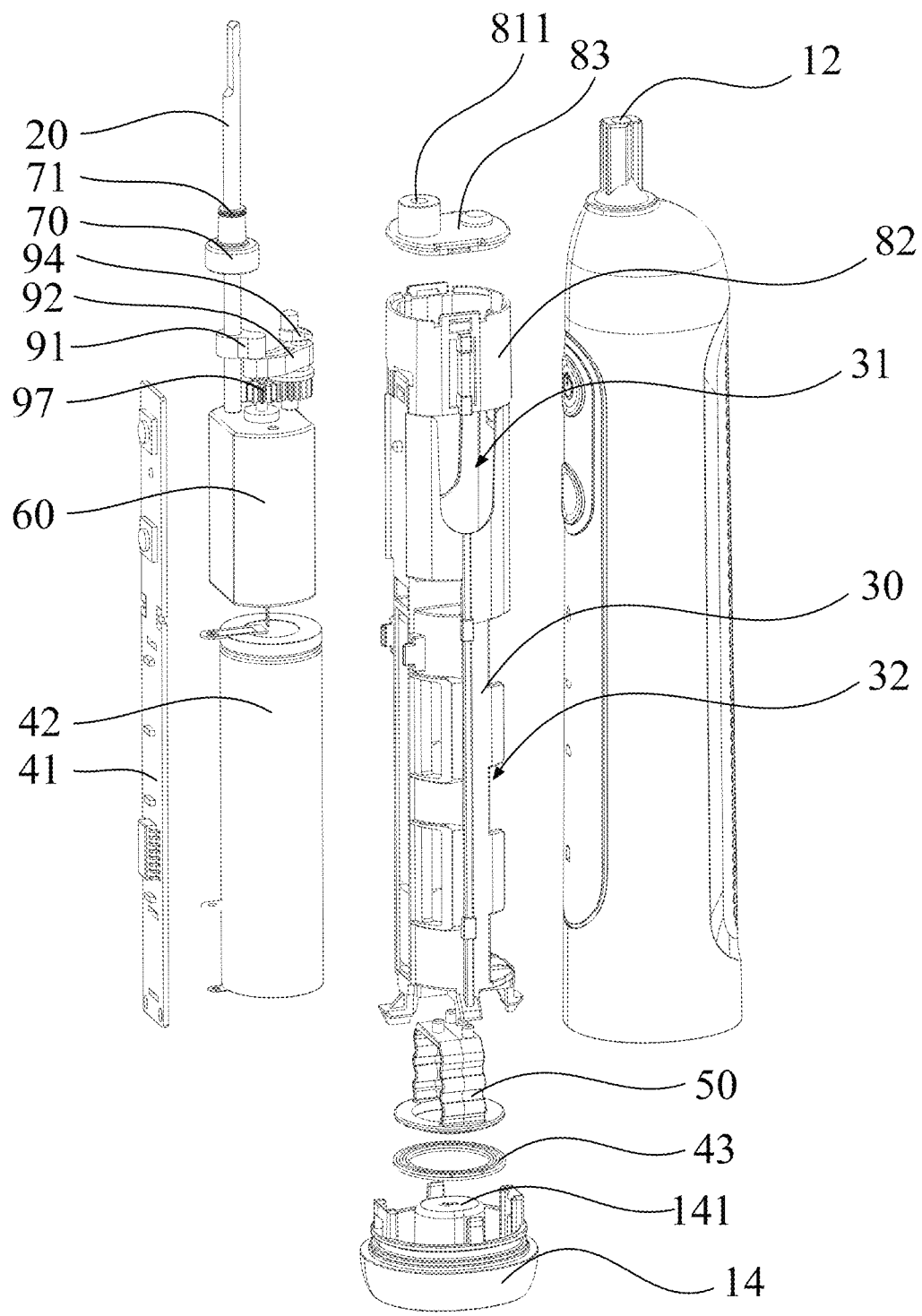
FIG. 1 is a schematic structural diagram of an embodiment of an electric toothbrush handle in an exploded state according to the present invention.

| Reference numeral | Name | Reference numeral | Name |
|---|---|---|---|
| 12 | First mounting hole | 811 | Second mounting hole |
| 13 | Main housing | 812 | Third mounting hole |
| 14 | End cover | 82 | Second housing |
| 14 | Fourth limiting boss | 821 | First limiting boss |
| 20 | Drive rod | 822 | Third limiting groove |
| 21 | Second limiting groove | 83 | Sealing cover |
| 30 | Mounting frame | 831 | Second limiting boss |
| 31 | Second mounting cavity | 84 | First limiting groove |
| 32 | Third mounting cavity | 91 | First transmission arm |
| 41 | Main control board | 911 | Fourth mounting hole |
| 42 | Battery | 912 | Limiting block |
| 43 | Wireless charging coil | 92 | Second transmission arm |
| 50 | Elastic abutment member | 93 | Mounting groove |
| 51 | Elastic portion | 94 | Rotating member |
| 511 | Transverse plate | 941 | Main body |
| 512 | Elastic side plate | 942 | Eccentric shaft |
| 52 | Abutment ring | 943 | Tooth portion |
| 53 | Positioning shaft | 95 | First rotating shaft |
| 60 | Drive motor | 96 | Second rotating shaft |
| 61 | Third limiting boss | 97 | Driving gear |
| 70 | Sealing rubber sleeve | 98 | Third rotating shaft |
| 71 | Tightening spring | | |

The realization of the objectives, the functional features, and the advantages of the present invention will be further explained in conjunction with the embodiments and with reference to the drawings.

DETAILED DESCRIPTION OF EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

The present invention provides an electric toothbrush handle.

In an embodiment of the present invention, as shown in FIGS. 1 to 7, the electric toothbrush handle comprises:
- a first housing, wherein the first housing is provided with a first mounting cavity and a first mounting hole 12 communicated with the first mounting cavity;
- a drive rod 20, wherein one end of the drive rod 20 extends into the first mounting cavity from the first mounting hole 12;
- a transmission mechanism, wherein the transmission mechanism is arranged in the first mounting cavity, the transmission mechanism comprises a mounting box and a transmission assembly arranged in the mounting box, the mounting box is provided with a second mounting hole 811 corresponding to the first mounting hole 12, the drive rod 20 extends into the mounting box from the second mounting hole 811, the transmission assembly comprises a first transmission arm 91 fixed on the drive rod 20, a second transmission arm 92 with one end hinged to the first transmission arm 91 and a rotating member 94 hinged to the other end of the second transmission arm 92, the rotating member 94 comprises a main body 941 and an eccentric shaft 942 eccentrically arranged on the main body 941, and the rotating member 94 is hinged to the second transmission arm 92 through the eccentric shaft 942; and
- a drive motor 60, wherein the drive motor 60 is arranged in the first mounting cavity, the mounting box is further provided with a third mounting hole 812, and the drive motor 60 is in driving connection with the rotating member 94 of the transmission mechanism through the third mounting hole 812.

In this embodiment, the first housing is the main body 941 of the electric toothbrush handle and has a first mounting cavity, wherein the mounting cavity is used to accommodate the transmission mechanism and the drive motor 60. Meanwhile, the first housing is provided with a first mounting hole 12 communicated with the first mounting cavity and configured for the drive rod 20 to extend therein. Specifically, one end of the drive rod 20 extends into the first mounting cavity from the first mounting hole 12 for connecting to the transmission mechanism and transmitting a driving force of the motor to the brush head. It should be noted that the brush head of the electric toothbrush is fixed to a portion of the drive rod 20 located outside the first housing, so that the brush head swings with the rotation of the drive rod 20.

The transmission mechanism, a core part of the present invention, is arranged in the first mounting cavity and is configured to transmit the driving force of the drive motor 60, so as to drive the drive rod 20 to swing. Specifically, the transmission assembly is arranged in the mounting box, and the transmission assembly comprises a first transmission arm 91 fixed on the drive rod 20, a second transmission arm 92 hinged to the first transmission arm 91, and a rotating member 94 hinged to the other end of the second transmission arm 92. The rotating member 94 comprises a main body 941 and an eccentric shaft 942 eccentrically arranged on the main body 941, and is hinged to the second transmission arm 92 through the eccentric shaft 942. When driven by the drive motor 60, the rotating member 94 can, through the action of the eccentric shaft 942, enable the second transmission arm 92 to swing in a larger range, thereby driving the first transmission arm 91 and the drive rod 20 to swing.

The drive motor 60 is a power component of the electric toothbrush handle, and is configured to provide power for the swing of the drive rod 20. The drive motor 60 is arranged in the first mounting cavity, and is in driving connection with the rotating member 94 of the transmission mechanism through the third mounting hole 812 on the mounting box. When the drive motor 60 is started, the driving force of the drive motor 60 is transmitted to the transmission assembly through the rotating member 94, thereby driving the drive rod 20 and the brush head to swing.

According to the technical solution of the present invention, one end of a drive rod 20 extends into a mounting box from a first mounting hole 12 and a second mounting hole 811, a first transmission arm 91 is fixed on the drive rod 20, one end of the first transmission arm 91 is hinged to a second transmission arm 92, the other end of the second transmission arm 92 is hinged to a rotating member 94, wherein the rotating member 94 comprises a main body 941 and an eccentric shaft 942 eccentrically arranged on the main body 941, the rotating member 94 is hinged to the second transmission arm 92 through the eccentric shaft 942, a drive motor 60 is arranged in a first mounting cavity, the drive motor 60 is in driving connection with the rotating member 94 of a transmission mechanism through a third mounting hole 812 so as to drive the rotating member 94 to rotate, the drive rod 20 can receive a stronger driving force through the matching use of the first transmission arm 91, the second transmission arm 92 and the rotating member 94 in the transmission mechanism, and further drive a brush head to reciprocate in a larger range, so that the brush head can penetrate deep between teeth and hard-to-reach areas for cleaning, which effectively improves the cleaning effect of the electric toothbrush.

Further, as shown in FIGS. 1 to 3 and 7, the transmission assembly further comprises a driving gear 97, a tooth portion 943 meshing with the driving gear 97 is arranged on a periphery of the rotating member 94, and the driving gear 97 is fixed on the drive shaft of the drive motor 60. In this embodiment, the drive motor 60 transmits power through a gear. When the drive motor 60 is started, the drive shaft of the drive motor 60 drives the driving gear 97 fixed thereon to rotate. Since the tooth portion 943 of the driving gear 97 meshes with the tooth portion 943 on the periphery of the rotating member 94, the rotation of the driving gear 97 directly drives the rotating member 94 to rotate. The eccentric shaft 942 of the rotating member 94 moves along with the rotation of the rotating member 94, and then the drive rod 20 and the brush head swing under the hinging action of the second transmission arm 92 and the first transmission arm 91. In this way, stable connection and efficient transmission between the transmission mechanism and the drive motor 60 are further ensured, and the working efficiency and the use experience of the electric toothbrush are effectively improved.

Figure 5:
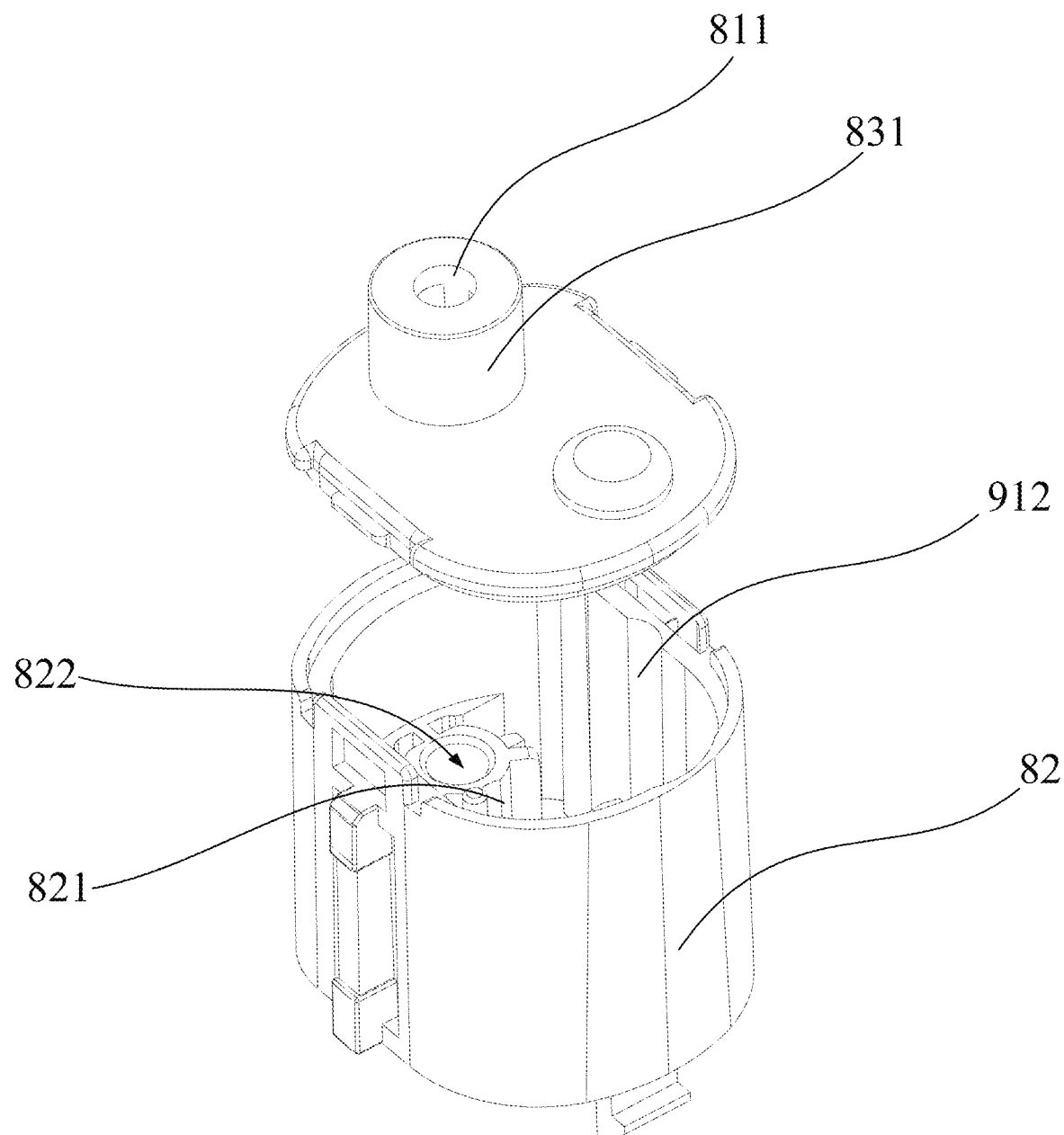
FIG. 5 is a schematic structural diagram of a mounting box in an exploded state from an angle.
Figure 6:
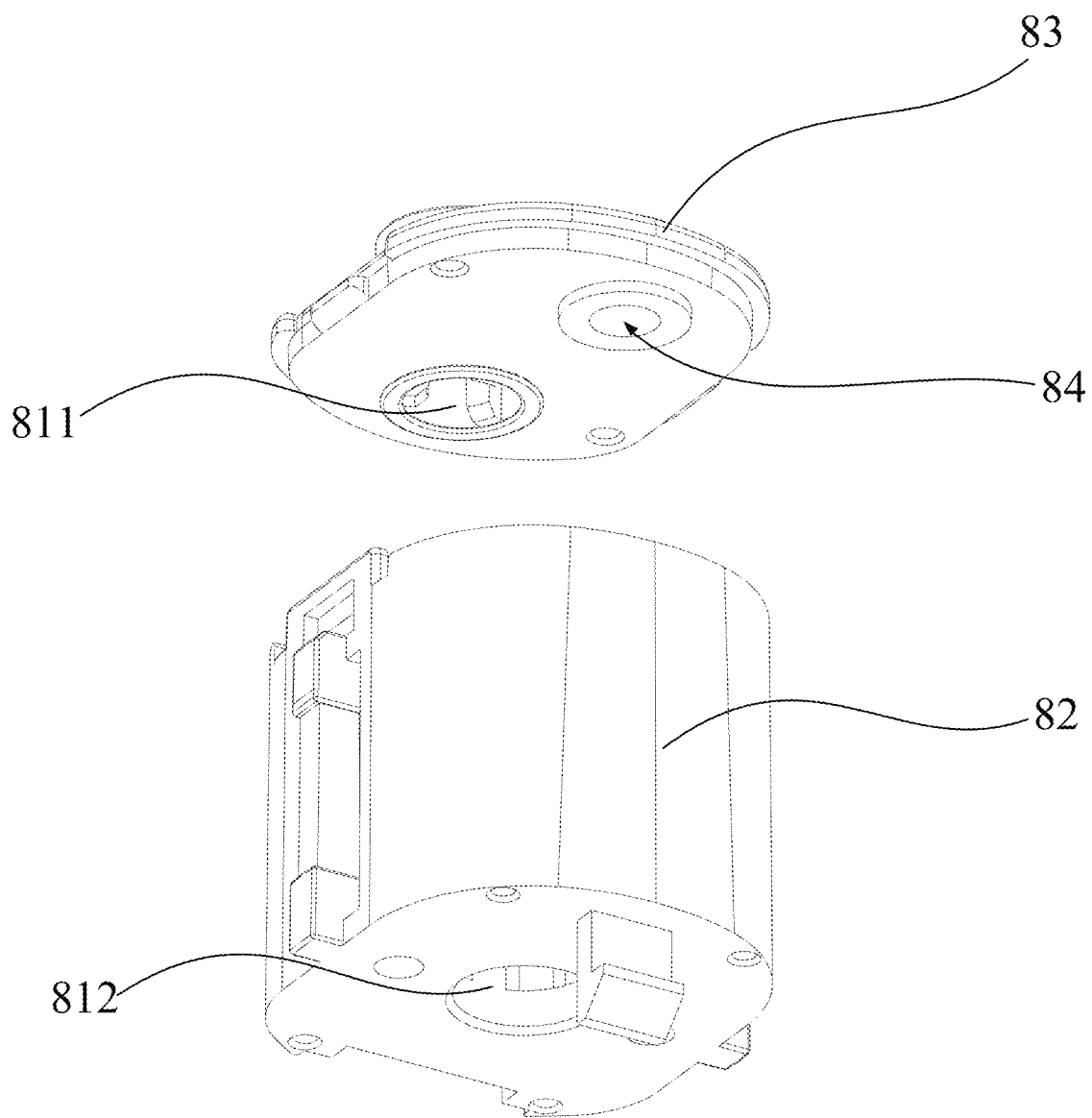
FIG. 6 is a schematic structural diagram of a mounting box in an exploded state from another angle.
Figure 7:
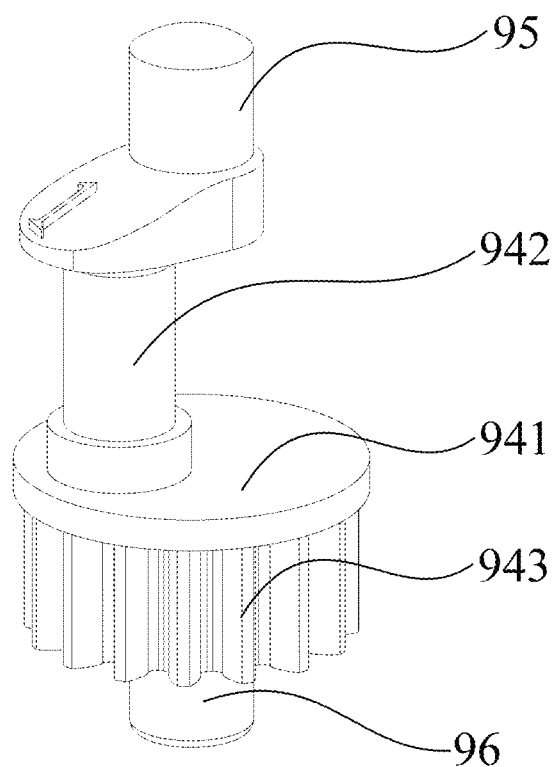
FIG. 7 is a schematic structural diagram of a rotating member.

Further, as shown in FIGS. 1, 5 and 6, the mounting box comprises a second housing 82 and a sealing cover 83 matched with the second housing 82, the rotating member 94 further comprises a first rotating shaft 95 and a second rotating shaft 96 that are coaxially arranged, the first rotating shaft 95 is fixed at one end of the eccentric shaft 942 far away from the main body 941, the second rotating shaft 96 is fixed at one side of the main body 941 opposite to the eccentric shaft 942, the sealing cover 83 and the second housing 82 are respectively provided with first limiting grooves 84 corresponding to the first rotating shaft 95 and the second rotating shaft 96, and the first rotating shaft 95 and the second rotating shaft 96 are located in the first limiting grooves 84. In this embodiment, the first rotating shaft 95 and the second rotating shaft 96 are fixed parts of the rotating member 94, and are configured to prevent the rotating member 94 from moving in a horizontal direction and affecting the rotation stability of the rotating member 94. The first rotating shaft 95 and the second rotating shaft 96 are both arranged on the central axis of the main body 941 and on opposite sides of the main body 941. The first rotating shaft 95 and the eccentric shaft 942 are connected and fixed by a connecting structure. Meanwhile, the sealing cover 83 and the second housing 82 are provided with first limiting grooves 84 fixed to the first rotating shaft 95 and the second rotating shaft 96, and the first rotating shaft 95 and the second rotating shaft 96 are located in the first limiting grooves 84, thereby effectively maintaining the rotation stability of the rotating member 94.

Figure 2:
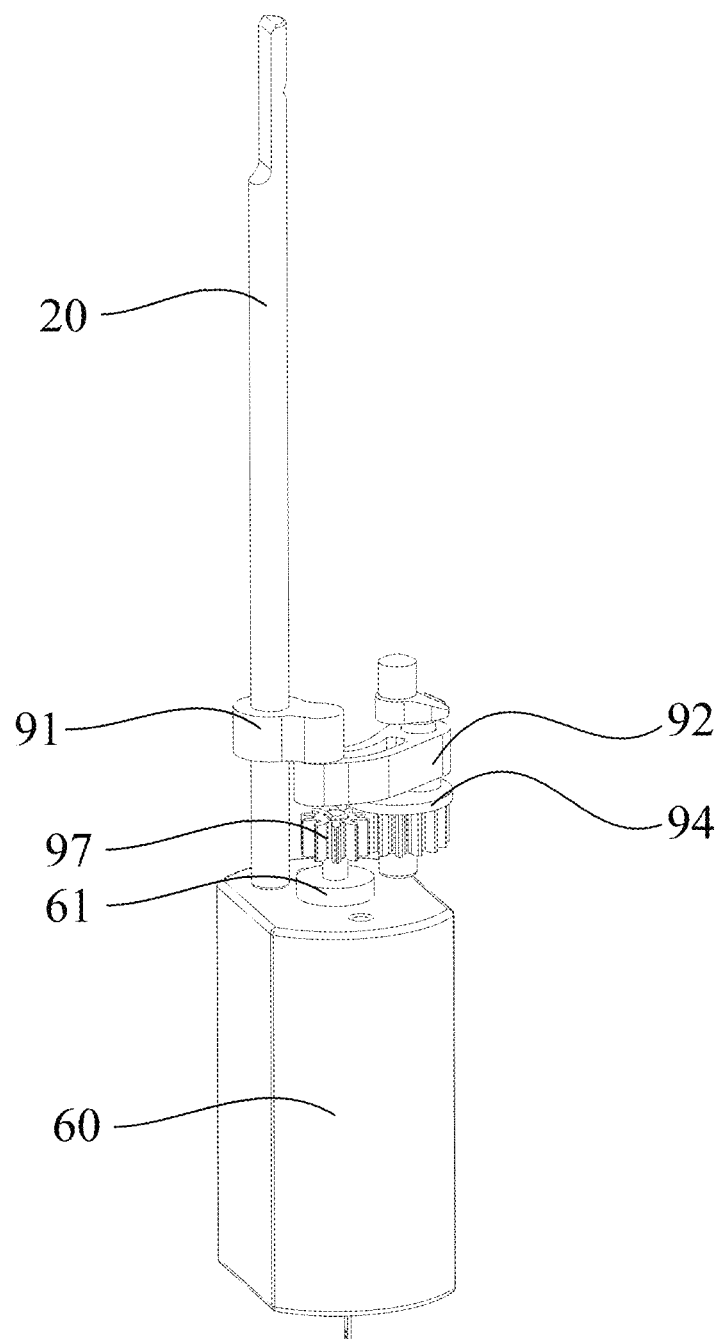
FIG. 2 is a schematic structural diagram of a drive rod and a transmission assembly.
Figure 3:
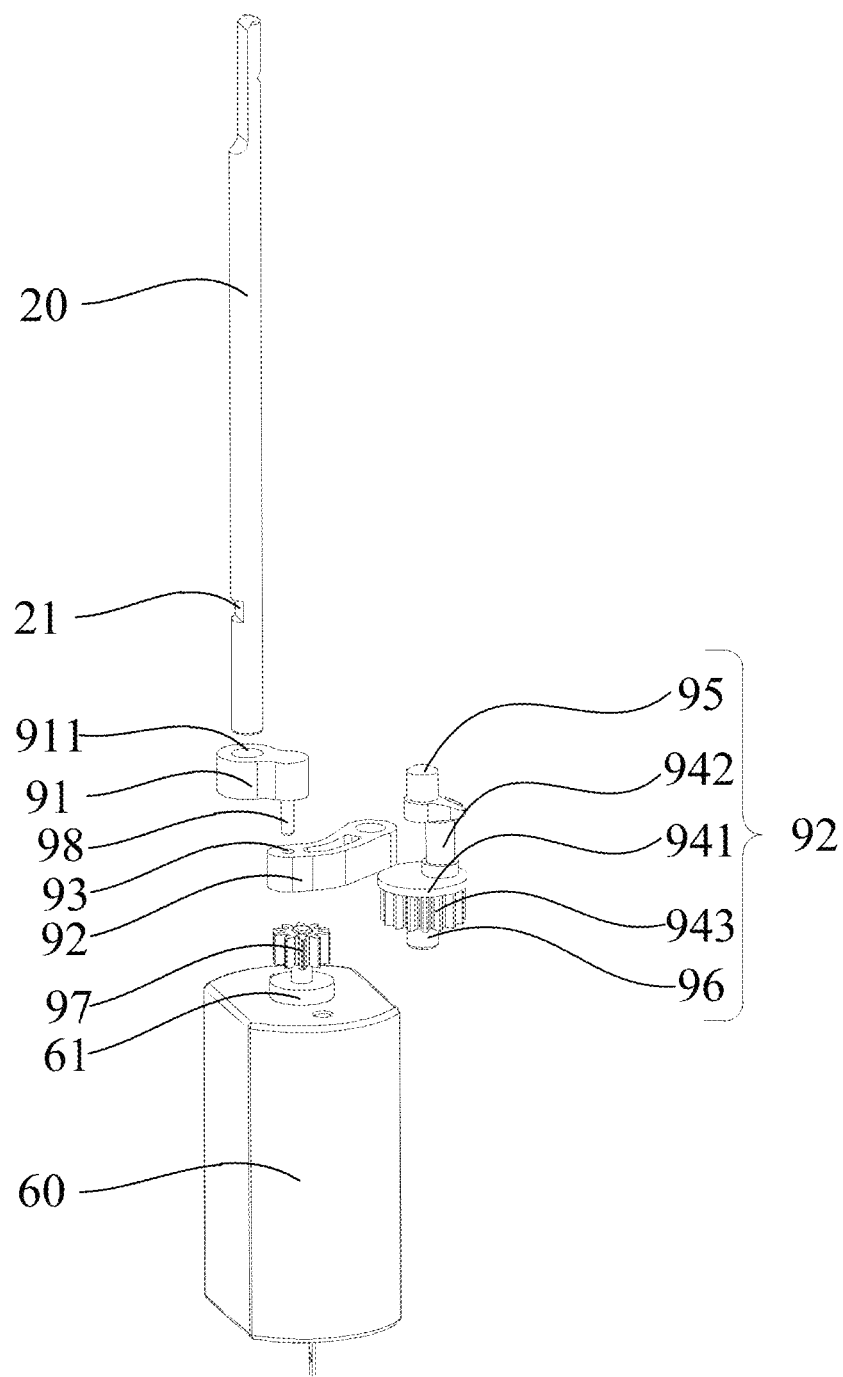
FIG. 3 is a schematic structural diagram of a drive rod and a transmission assembly in an exploded state.

Further, as shown in FIGS. 1 to 3, the second transmission arm 92 is shaped as an elongated arc. In this embodiment, in the transmission design of the electric toothbrush, the drive rod 20 and the transmission mechanism need to be closely matched to achieve efficient power transmission. However, if the transmission arm is not properly designed, it may interfere with the drive rod 20 and limit the swing range of the drive rod. In this embodiment, the second transmission arm 92 with a long arc shape is adopted, so that the movement track of the drive rod 20 can be skillfully avoided, thereby avoiding interference and ensuring that the drive rod 20 can freely and smoothly swing. Meanwhile, this arc design enables the second transmission arm 92 to generate a larger moment when driven, which not only helps to drive the rotating member 94 to rotate, but also further increases the swing range of the drive rod 20. A wider swing range means the brush head can cover a wider area when brushing teeth, which improves cleaning effect.

Further, as shown in FIGS. 1 to 3, the transmission assembly further comprises a third rotating shaft 98, the second transmission arm 92 and the first transmission arm 91 are both provided with mounting grooves 93, and two ends of the third rotating shaft 98 are respectively located in the mounting grooves 93 of the second transmission arm 92 and the first transmission arm 91. In this embodiment, the third rotating shaft 98 is configured to connect the second transmission arm 92 and the first transmission arm 91, so that the stability of transmission is enhanced, and the structure of the whole transmission assembly is more compact.

Figure 4:
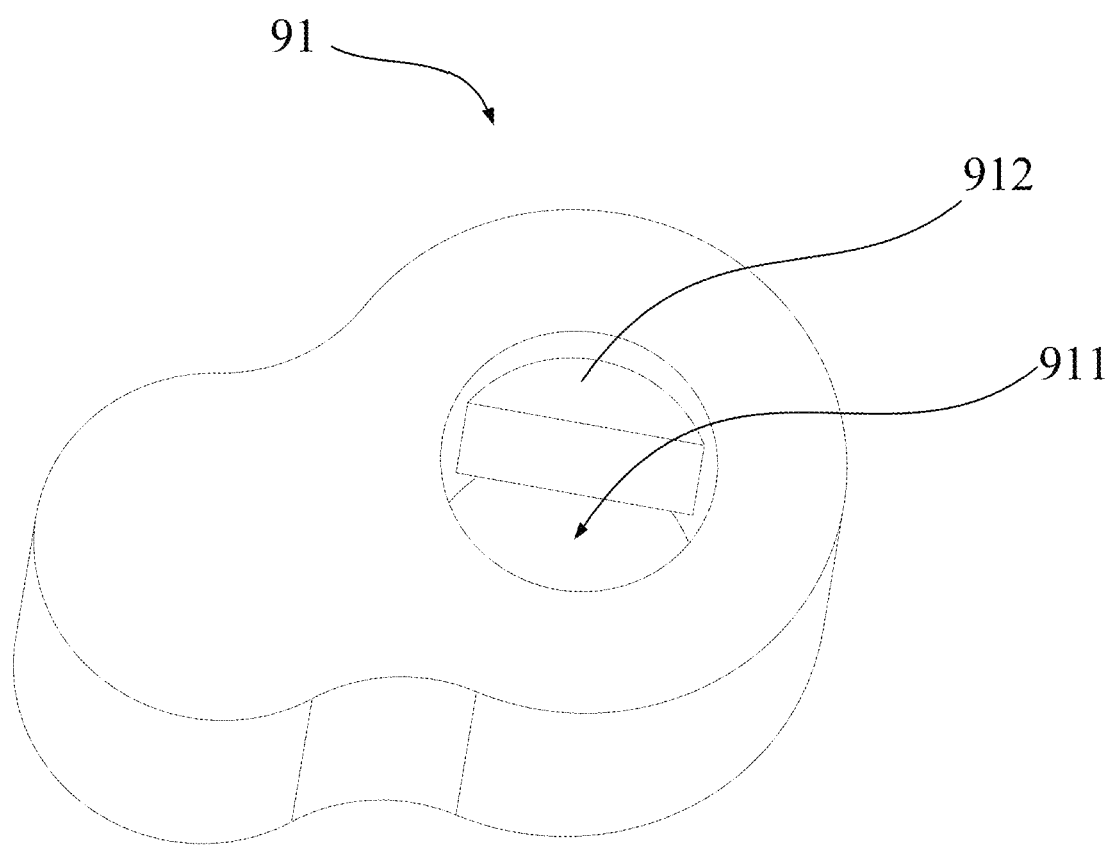
FIG. 4 is a schematic structural diagram of a first transmission arm.

Further, as shown in FIGS. 3 and 4, the first transmission arm 91 is provided with a fourth mounting hole 911, a limiting block 912 is arranged in the fourth mounting hole 911 of the first transmission arm 91, the drive rod 20 is provided with a second limiting groove 21 matched with the limiting block 912, the drive rod 20 is fixed in the fourth mounting hole 911, and the limiting block 912 is located in the second limiting groove 21. In this embodiment, the fourth mounting hole 911 is configured to fix the drive rod 20. Specifically, the drive rod 20 penetrates through the first mounting hole 12, and meanwhile, the limiting block 912 is arranged in the first mounting hole 12. An outer wall of the drive rod 20 is provided with the second limiting groove 21, and the drive rod 20 and the first transmission arm 91 are effectively fixed by the mutual matching of the limiting block 912 and the second limiting groove 21, so that the swing stability of the drive rod 20 is improved. It should be noted that the first transmission arm 91 is combined with the drive rod 20 by injection molding, so that the manufacturing process is simplified, and the production efficiency is improved. Meanwhile, the injection molding process can also ensure the strength and the durability of the connecting part, thereby prolonging the service life of the electric toothbrush.

Further, as shown in FIGS. 5 and 6, a first limiting boss 821 used to limit the drive rod 20 is convexly provided in the second housing 82, a third limiting groove 822 is formed at a top of the first limiting boss 821, and an end portion of the drive rod 20 is located in the third limiting groove 822. In this embodiment, the first limiting boss 821 is configured to better limit and fix the drive rod 20, as so to ensure stability and accuracy of the drive rod during operation. Specifically, a third limiting groove 822 is formed on the top of the first limiting boss 821, and an end portion of the drive rod 20 is located in the third limiting groove 822, so that the drive rod 20 is effectively prevented from horizontally moving in the swinging process, which affects the operation stability of the electric toothbrush, and the stability and the accuracy of the electric toothbrush handle are effectively improved.

Further, as shown in FIGS. 1 and 5, a second limiting boss 831 used to limit the drive rod 20 is provided on a periphery of the second mounting hole 811 of the sealing cover 83, and the second mounting hole 811 penetrates through the second limiting boss 831. In this embodiment, the second limiting boss 831 is configured to further limit and fix the drive rod 20, so that the end portion of the drive rod 20 is limited by the first limiting boss 821, the rod body of the drive rod 20 is limited by the second limiting boss 831, and the stability of the operation of the electric toothbrush handle is effectively improved.

Further, as shown in FIG. 1, the electric toothbrush handle further comprises a sealing rubber sleeve 70, the sealing rubber sleeve 70 is arranged on an outer wall of the drive rod 20, one end of the sealing rubber sleeve 70 abuts against the second limiting boss 831, and the other end abuts against an inner wall of the first housing. In this embodiment, the sealing rubber sleeve 70 is configured to improve the overall waterproof and dustproof performance of the electric toothbrush. Specifically, the sealing rubber sleeve 70 is closely joined to the outer wall of the drive rod 20. Meanwhile, one end of the sealing rubber sleeve 70 abuts against the top of the second limiting boss 831, so that the second limiting boss 831 provides support for the sealing rubber sleeve 70; the other end of the sealing rubber sleeve 70 abuts against the inner wall of the first housing, thereby effectively preventing the liquid from entering the first mounting cavity through the first mounting hole 12 during the cleaning process of the user, so that the waterproof and dustproof performance and stability of the electric toothbrush handle are effectively improved. In addition, the service life and the reliability of the product are improved, and better use experience is brought to the user.

Further, as shown in FIG. 1, the electric toothbrush handle further comprises a tightening spring 71, and the tightening spring 71 is sleeved on one end of the sealing rubber sleeve 70 far away from the second limiting boss 831. In this embodiment, the tightening spring 71 is configured to further enhance the sealing performance of the electric toothbrush handle. The tightening spring 71 is sleeved on an outer wall of a sealing rubber strip and applies a continuous tightening force to the sealing rubber sleeve 70, which ensures a close joint between the sealing rubber sleeve 70 and the drive rod 20, and effectively prevents the sealing rubber sleeve 70 from sliding on the drive rod 20. Therefore, the intrusion of foreign matter such as moisture and dust is further effectively prevented, and the sealing performance and stability of the electric toothbrush handle are enhanced.

Further, as shown in FIGS. 1 to 3, a third limiting boss 61 adapted to the third mounting hole 812 is arranged on a periphery of a drive shaft of the drive motor 60, and the third limiting boss 61 is located in the third mounting hole 812. In this embodiment, the third limiting boss 61 is configured to improve the sealing performance of the mounting box. Since the transmission assemblies are all mechanical structures, in the transmission process, friction will occur between the components to transmit force. Therefore, lubricating oil will be filled in the mounting box to ensure the smooth operation of the transmission assemblies. Since the lubricating oil is liquid, it will overflow along the mounting hole; consequently, the stability of other structures of the electric toothbrush handle is affected. In this embodiment, a third limiting boss 61 is provided on a drive shaft bearing of the drive motor 60. The third limiting boss 61 seals the third mounting hole 812, thereby effectively preventing the leakage of lubricating oil, so that the structural stability of the electric toothbrush handle is effectively improved.

Further, as shown in FIG. 1, the electric toothbrush handle further comprises a mounting frame 30 arranged in the first mounting cavity, a second mounting cavity 31 is formed in the mounting frame 30, the drive motor 60 is arranged in the second mounting cavity 31, and one end of the mounting frame 30 is fixedly connected to the mounting box. In this embodiment, the mounting frame 30 is used to provide a mounting position for other components of the electric toothbrush handle. The drive motor 60 is arranged in the second mounting cavity 31, thereby effectively fixing the drive motor 60, and meanwhile, the drive motor 60 is also protected. The mounting frame 30 can prevent direct impact and damage of external factors to the drive motor 60, thereby improving the service life of the drive motor 60. In addition, one end of the mounting frame 30 is fixedly connected to the mounting box through a buckle, so that the mounting frame 30 is stably connected to the mounting box.

Further, as shown in FIG. 1, the electric toothbrush handle further comprises a control assembly arranged in the first mounting cavity, the control assembly comprises a main control board 41 electrically connected to the drive motor 60 and a battery 42 electrically connected to the main control board 41, a third mounting cavity 32 is also formed in the mounting frame 30, the main control board 41 is fixed to an outer wall of the mounting frame 30, and the battery 42 is arranged in the third mounting cavity 32. In this embodiment, the control assembly is configured to control the operation mode of the electric toothbrush handle. The main control board 41 is a control element, the battery 42 is configured to supply power to the drive motor 60, and the third mounting cavity 32 is configured to fix the battery 42, thereby improving the structural stability of the electric toothbrush handle.

Further, for example, the control assembly further comprises a wireless charging coil 43 electrically connected to the main control board 41, and the wireless charging coil 43 is arranged near a bottom of the electric toothbrush handle and is configured to wirelessly charge the battery 42.

Figure 8:
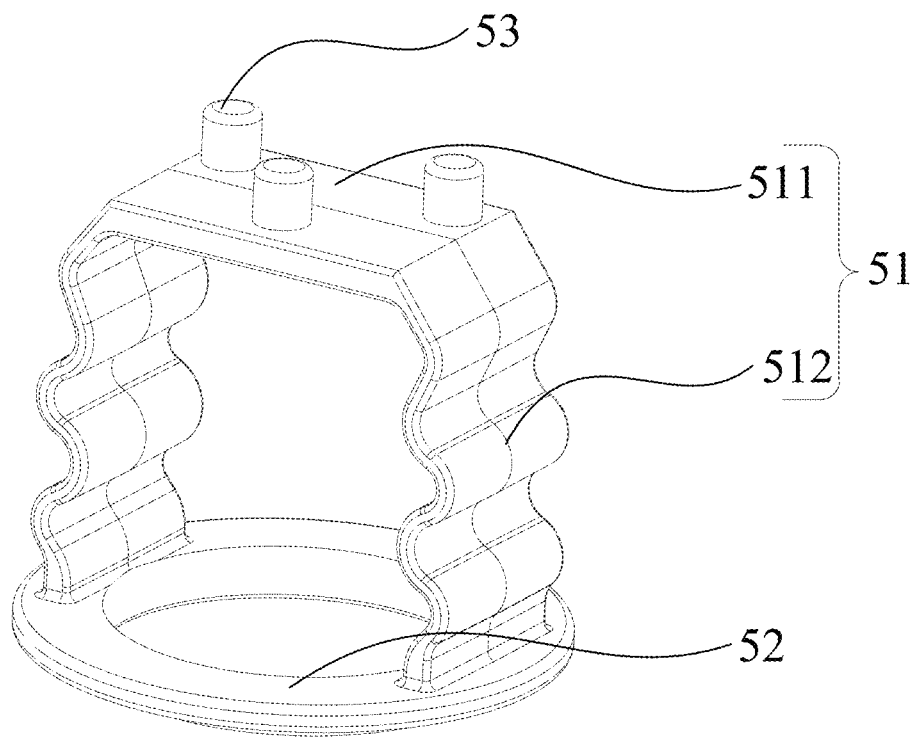
FIG. 8 is a schematic structural diagram of an elastic abutment member.

Further, as shown in FIGS. 1 and 8, the electric toothbrush handle further comprises an elastic abutment member 50, the elastic abutment member 50 is arranged at a bottom of the mounting frame 30, one side of the elastic abutment member 50 abuts against the mounting frame 30, and the other side abuts against the wireless charging coil 43. In this embodiment, the elastic abutment member 50 is configured to fix the wireless charging coil 43. Specifically, one side of the elastic abutment member 50 abuts against the mounting frame 30, and the other side abuts against the wireless charging coil 43. Therefore, the wireless charging coil 43 is stably fixed at the bottom of the first housing, which effectively prevents the wireless charging coil 43 from being displaced due to external force, affecting the charging effect of the electric toothbrush handle, and the structural stability of the electric toothbrush handle is effectively improved. It should be noted that the elastic abutment member 50 is at least partially made of a flexible material or an elastic material, so as to provide a continuous pressing force to the wireless charging coil 43.

Further, the elastic abutment member 50 comprises an elastic portion 51 and an abutment ring 52, the elastic portion 51 comprises a transverse plate 511 and two elastic side plates 512 connected to two ends of the transverse plate 511 respectively, the transverse plate 511 abuts against the mounting frame 30, one end of each of the two elastic side plates 512 far away from the transverse plate 511 is fixed to each of two opposite sides of the abutment ring 52, and the abutment ring 52 abuts against the wireless charging coil 43.

Further, the elastic side plate 512 is made of a flexible material, and the elastic side plate 512 is in a wave shape.

Further, the elastic abutment member 50 further comprises at least one positioning shaft (53), the mounting frame 30 is provided with a positioning groove matched with the positioning shaft (53), the positioning shaft (53) is located in the positioning groove, and the position of the elastic abutment member 50 on the mounting frame 30 can be ensured to be accurate through matching of the positioning shaft (53) and the positioning groove. The stable placement of the wireless charging coil 43 is facilitated, and the reduction of charging efficiency or charging failure caused by position deviation can also be avoided. Therefore, the stability and reliability of the wireless charging coil 43 are effectively improved.

Further, as shown in FIG. 1, the first housing comprises a main housing 13 and an end cover 14 fixedly connected to the main housing 13, a fourth limiting boss 141 is convexly provided in the end cover 14, and the wireless charging coil 43 and the abutment ring 52 are both sleeved outside the fourth limiting boss 141. In this embodiment, the first housing is composed of the main housing 13 and the end cap 14 fixedly connected thereto. A fourth limiting boss 141 is protruded from the inside of the end cover 14. The fourth limiting boss 141 plays a supporting and positioning role, which ensures that the wireless charging coil 43 and the abutment ring 52 can be stably sleeved outside of the fourth limiting boss.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

What is claimed is:

1. An electric toothbrush handle, comprising:
   a first housing, wherein the first housing is provided with a first mounting cavity and a first mounting hole communicated with the first mounting cavity;
   a drive rod, wherein one end of the drive rod extends into the first mounting cavity from the first mounting hole;
   a transmission mechanism, wherein the transmission mechanism is arranged in the first mounting cavity, the transmission mechanism comprises a mounting box and a transmission assembly arranged in the mounting box, the mounting box is provided with a second mounting hole corresponding to the first mounting hole, the drive rod extends into the mounting box from the second mounting hole, the transmission assembly comprises a first transmission arm fixed on the drive rod, a second transmission arm with one end hinged to the first transmission arm and a rotating member hinged to the other end of the second transmission arm, the rotating member comprises a main body and an eccentric shaft eccentrically arranged on the main body, and the rotating member is hinged to the second transmission arm through the eccentric shaft; and
   a drive motor, wherein the drive motor is arranged in the first mounting cavity, the mounting box is further provided with a third mounting hole, and the drive motor is in driving connection with the rotating member of the transmission mechanism through the third mounting hole;
   wherein the electric toothbrush handle further comprises a mounting frame arranged in the first mounting cavity, a second mounting cavity is formed in the mounting frame, the drive motor is arranged in the second mounting cavity, and one end of the mounting frame is fixedly connected to the mounting box;
   the electric toothbrush handle further comprises a control assembly arranged in the first mounting cavity, the control assembly comprises a main control board electrically connected to the drive motor and a battery electrically connected to the main control board, a third mounting cavity is also formed in the mounting frame, the main control board is fixed to an outer wall of the mounting frame, and the battery is arranged in the third mounting cavity;
   the control assembly further comprises a wireless charging coil electrically connected to the main control board, and the wireless charging coil is arranged near a bottom of the electric toothbrush handle;
   the electric toothbrush handle further comprises an elastic abutment member, the elastic abutment member is arranged at a bottom of the mounting frame, one side of the elastic abutment member abuts against the mounting frame, and an other side abuts against the wireless charging coil;
   the elastic abutment member comprises an elastic portion and an abutment ring, the elastic portion comprises a transverse plate and two elastic side plates connected to two ends of the transverse plate respectively, the transverse plate abuts against the mounting frame, one end of each of the two elastic side plates far away from the transverse plate is fixed to each of two opposite sides of the abutment ring, and the abutment ring abuts against the wireless charging coil.

2. The electric toothbrush handle according to claim 1, wherein the transmission assembly further comprises a driving gear, a tooth portion meshing with the driving gear is arranged on a periphery of the rotating member, and the driving gear is fixed on a drive shaft of the drive motor.

3. The electric toothbrush handle according to claim 2, wherein the mounting box comprises a second housing and a sealing cover matched with the second housing, the rotating member further comprises a first rotating shaft and a second rotating shaft that are coaxially arranged, the first rotating shaft is fixed at one end of the eccentric shaft far away from the main body, the second rotating shaft is fixed at one side of the main body opposite to the eccentric shaft, the sealing cover is provided with a first limiting groove corresponding to the first rotating shaft, and the first rotating shaft is located in the first limiting groove.

4. The electric toothbrush handle according to claim 3, wherein a first limiting boss configured to limit the drive rod is convexly provided in the second housing, a third limiting groove is formed at a top of the first limiting boss, and an end portion of the drive rod is located in the third limiting groove.

5. The electric toothbrush handle according to claim 4, wherein a second limiting boss configured to limit the drive rod is provided on a periphery of the second mounting hole of the sealing cover, and the second mounting hole penetrates through the second limiting boss.

6. The electric toothbrush handle according to claim 5, wherein the electric toothbrush handle further comprises a sealing rubber sleeve, the sealing rubber sleeve is sleeved on an outer wall of the drive rod, one end of the sealing rubber sleeve abuts against the second limiting boss, and the other end abuts against an inner wall of the first housing.

7. The electric toothbrush handle according to claim 6, wherein the electric toothbrush handle further comprises a tightening spring, and the tightening spring is sleeved on one end of the sealing rubber sleeve far away from the second limiting boss.

8. The electric toothbrush handle according to claim 3, wherein the second transmission arm is shaped as an elongated arc.

9. The electric toothbrush handle according to claim 1, wherein the transmission assembly further comprises a third rotating shaft, the second transmission arm and the first transmission arm are both provided with mounting grooves, and two ends of the third rotating shaft are respectively located in the mounting grooves of the second transmission arm and the first transmission arm.

10. The electric toothbrush handle according to claim 1, wherein the first transmission arm is provided with a fourth mounting hole, a limiting block is arranged in the fourth mounting hole of the first transmission arm, the drive rod is provided with a second limiting groove matched with the limiting block, the drive rod is fixed in the fourth mounting hole, and the limiting block is located in the second limiting groove.

11. The electric toothbrush handle according to claim 1, wherein a third limiting boss adapted to the third mounting hole is arranged on a periphery of a drive shaft of the drive motor, and the third limiting boss is located in the third mounting hole.

12. The electric toothbrush handle according to claim 1, wherein the elastic side plate is made of a flexible material, and the elastic side plate is in a wave shape.

13. The electric toothbrush handle according to claim 1, wherein the elastic abutment member further comprises at least one positioning shaft, the mounting frame is provided with a positioning groove matched with the positioning shaft, and the positioning shaft is located in the positioning groove.

14. The electric toothbrush handle according to claim 13, wherein the first housing comprises a main housing and an end cover fixedly connected to the main housing, a fourth limiting boss is convexly provided in the end cover, and the wireless charging coil and the abutment ring are both sleeved outside the fourth limiting boss.

\* \* \* \* \*